United States Patent [19]

Hubbard et al.

[11] Patent Number: 4,633,275
[45] Date of Patent: Dec. 30, 1986

[54] MEANS FOR MOUNTING A PEN ON A CHART RECORDER

[75] Inventors: James R. Hubbard, Moorestown; Frank V. Idell, Camden, both of N.J.

[73] Assignee: Graphic Controls Corporation, Buffalo, N.Y.

[21] Appl. No.: 778,287

[22] Filed: Sep. 20, 1985

Related U.S. Application Data

[63] Continuation of Ser. No. 537,334, Sep. 29, 1983.

[51] Int. Cl.⁴ ............................................ G01D 15/16
[52] U.S. Cl. ......................... 346/140 R; 346/140 A; 24/662; 403/333
[58] Field of Search ........... 346/140 R, 140 A, 139 C; 403/333, 334, 361; 339/221 R, 273 F, 276 SF, 276 F; 24/662

[56] References Cited

U.S. PATENT DOCUMENTS

| | | | |
|---|---|---|---|
| 1,630,297 | 5/1927 | Heesch | 346/140 A |
| 3,611,430 | 10/1971 | Watchorn | 346/140 A |
| 4,024,547 | 5/1977 | Raahauge | 346/140 A |
| 4,048,640 | 9/1977 | Caldwell | 346/140 A |
| 4,052,713 | 10/1977 | Lytle | 346/140 A |
| 4,316,197 | 2/1982 | Hubbard | 346/140 R |

Primary Examiner—Joseph W. Hartary
Attorney, Agent, or Firm—Ratner & Prestia

[57] ABSTRACT

A recording instrument pen and pen arm and the combination thereof, the mounting means comprising a rearwardly extending channel-defining member associated with said pen and including a slot having two widthwise segments at lengthwise positions thereof, the forward segment being of lesser width than the rearward segment, the forward tip of the pen arm being adapted to be received in said slot and to be securely positioned by engagement at at least four spaced-apart positions therein.

8 Claims, 4 Drawing Figures

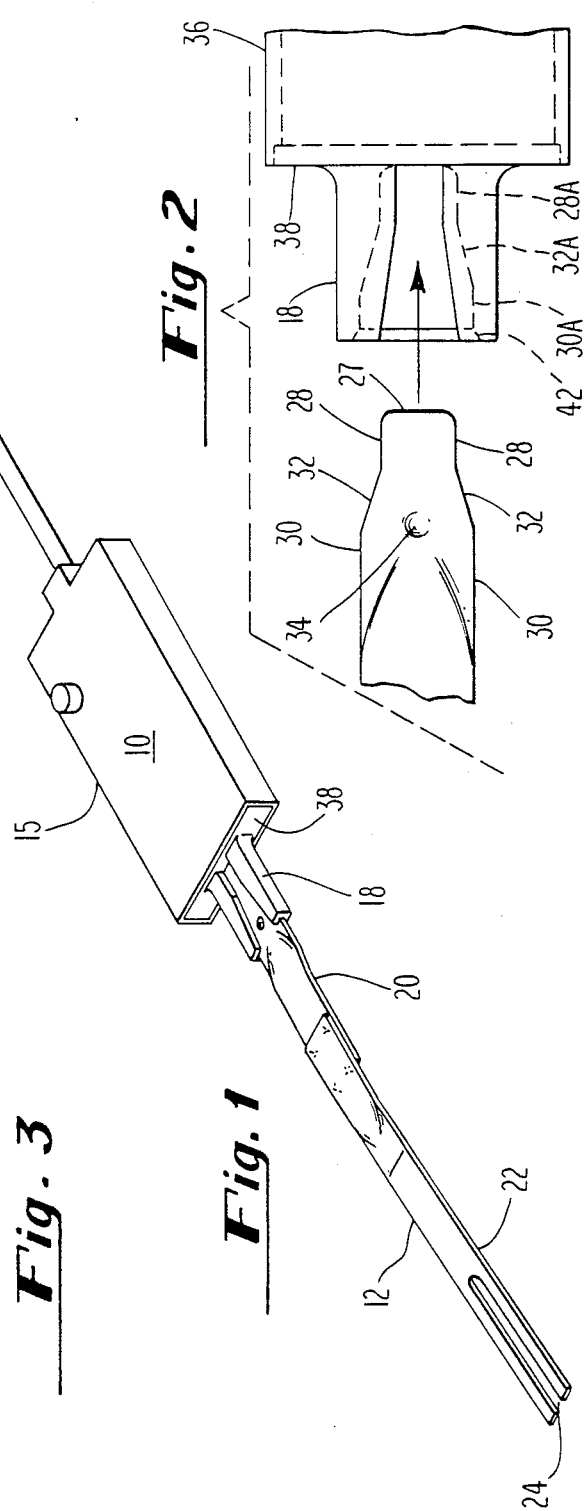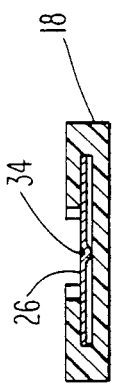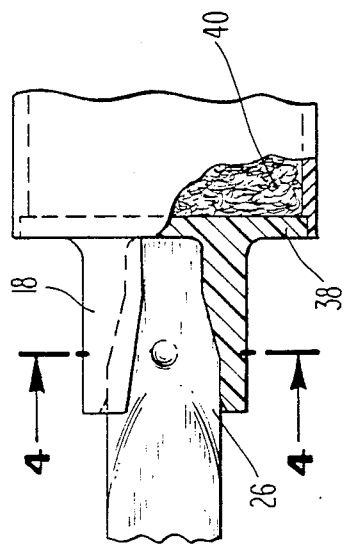

MEANS FOR MOUNTING A PEN ON A CHART RECORDER

This application is a continuation, of application Ser. No. 537,334, filed 9/29/83.

BACKGROUND OF THE INVENTION

This invention pertains to a marker or pen (the terms "marker" and "pen" are used interchangeably herein) for a chart recorder and particularly to improved mounting means therefor.

As illustrated for example in U.S. Pat. No. 3,611,430—Watchorn; U.S. Pat. No. 3,934,255—Taylor; U.S. Pat. No. 3,983,569—Hubbard; U.S. Pat. No. 4,024,547—Rahauge; and U.S. Pat. No. 4,048,640—Caldwell, a variety of means has been provided for mounting a marker or pen on the end of a blade-like pen arm in a recording instrument.

In many such instruments, a plurality of such pen arms and markers are provided in a single instrument so as to permit the recording of multiple traces, representing different variables on a single chart. As recording instruments have become progressively smaller, pen configurations have been adapted to permit a plurality of pens to work in concert in such instruments with a minimum of inter-pen spacing. In the design described in the Caldwell patent, this is accomplished by pressing the marker pen onto the tip of a pen arm so that the marker is secured to the pen arm by frictional and elastic engagement of a deformable member in the marker body. Watchorn, Taylor, and Rahauge disclose markers with channel-forming members on one surface thereof. In the Caldwell design, these channel-forming members are eliminated and closer inter-pen passage is permitted.

Notwithstanding these prior designs, there remains a continuing need for a simple marker mounting means which permits close inter-pen passage and which is adapted to permit a marker to be mounted on a blade-type pen arm with a minimum of mounting force so as to avoid distension or distortion of the pen arm and yet to provide a secure and positively positioned mounting of the marker on the pen arm.

It is, therefore, the general object of the present invention to provide such a marker-pen arm mounting means.

BRIEF DESCRIPTION OF THE INVENTION

The present invention comprises a marker for a recorder instrument including a marker body and associated writing stylus, and specifically including a mounting means comprising a channel-forming member extending rearwardly from the marker body and forming a pen arm receiving slot adapted to receive the forward tip of a mating blade-type pen arm. Both the slot and the mating forward tip of the pen arm have at least two engageable widthwise segments, the first of which is located forwardly of the second and which is not as wide as the second. Each of these widthwise segments is relatively short in length so that relatively little mounting force is required upon installation of the marker on the pen arm, notwithstanding the engagement of the marker and pen arm.

Upon mounting of the marker on the pen arm, the marker is secured at the two lengthwise spaced-apart positions of the widthwise segments by engagement for the length of the widthwise segments on both sides thereof. This provides four spaced-apart engagement points between the pen arm and the marker and securely positions the pen on the pen arm.

Preferably, the forward mounting tip of the pen arm may be bowed slightly to enhance the engagement of the marker on the pen arm. Further, the forward mounting tip of the pen arm may be provided with a dimple for the same purpose.

For a better understanding of the present invention, reference may be made to the detailed description thereof which follows, taken in conjunction with the accompanying drawings and subjoined claims.

BRIEF DESCRIPTION OF THE DRAWINGS

FIG. 1 is a perspective view of the assembled pen and pen arm of the present invention;

FIG. 2 is an enlarged plan view of the rear end of the pen and the end tip end of the pen arm shown in FIG. 1;

FIG. 3 is an enlarged view of the elements shown in FIG. 2 in their assembled configuration, partially cut away;

FIG. 4 is an enlarged cross-sectional view of the pen-pen arm combination shown in the previous drawings, taken in the plane 4—4 of FIG. 3.

DETAILED DESCRIPTION OF THE INVENTION

As illustrated in FIG. 1, the pen 10 of the present invention comprises an ink supply body 15 associated with a writing tip 16 connected by an ink transmitting member 14. Preferably, body 15 contains a fibrous capillary ink-retaining reservoir 40 (as seen in FIG. 3), and member 14 comprises a stylus tube housing an ink wicking material in contact at the tip end thereof with the writing nib, which is preferably also fibrous. Preferably also, the reservoir material 40, the wicking material housed in stylus tube 14, and writing tip 16 comprise three capillary materials graded for increasing capillarity so as to form a complete functional ink storage and ink delivery system, as disclosed and claimed in U.S. Pat. No. 4,017,871—Hubbard.

Body 15 also includes a rearwardly extended channel-defining member 18, preferably associated with a rear body plug or closure 38.

Also seen in FIG. 1 is a blade-like pen arm 12 with a forward portion 20 adapted to be received in a mating channel-defining member of a pen such as pen 10 in FIG. 1. Pen arm 12 further includes a rearward segment with a mounting slot 24, preferably disposed in a pen arm segment 22, spot welded to forward portion 20.

As best illustrated in FIGS. 2 and 3, forward pen arm portion 20 includes a tongue 26 having two relatively short length widthwise segments 28 and 30, the forward segment 28 being of less width than the rearward segment 30, widthwise segments 28 and 30 being connected by a symmetrical tapered portion 32. Tongue 26 of forward portion 20 of pen arm 12 is adapted to be received in a mating channel-defining member associated with the pen such as channel-defining member 18, which specifically includes mating widthwise portions 28a and 30a, spaced apart lengthwise and connected by tapered section 32A so as to conform in shape to that of tongue 26. Preferably, the shape and dimensions of tongue 26, rearward of widthwise segment 28, also correspond to that of the mating slot in member 18. This provides a secure mounting and positioning engagement of pen arm 12 and marker body 15.

Because each of widthwise segments 30 and 28, together with their mating slot segments 30a and 28a, are of relatively short lengthwise extension, mounting of pen arm 12 in pen 10 involves only a short distance of sliding engagement before tongue 26 is fully received within the slot of channel-defining member 18. The significance of this feature is that relatively little force is required over a short distance to complete the assembly. Nevertheless, positive position-defining engagement is provided at at least four widthwise and lengthwise separated positions and is further assured by the forward contact of the forward edge 27 of tongue 26 against the rear wall of member 38. Member 38, is of course, received and secured in the forward housing 36 of pen body 15 so that the positive and secure positioning of pen arm 12 in channel-defining member 18 assures a secure and positive positioning of pen 10 on pen arm 12, notwithstanding the relatively slight mounting force required to complete the assembly.

The engagement of tongue 26 in the slot of channel-defining member 18 may be considered either frictional or resilient engagement and may be a combination of the two. Typically, tongue 26 is comprised of a resilient spring steel construction and may include a slight curvature as well as a dimple 34 so as to maintain the positive positioning of tongue 26 in the slot of channel-defining member 18. This is important to provide good initial engagement and also to ensure that engagement over a period of time since the relative dimensions of tongue 26 and channel-defining member 18 may change slightly with time. This may occur due to temperature changes or "creep" of molded plastic material, such as polypropylene and noryl, which are typical of the materials of construction utilized for channel-defining member 18.

Preferably, channel defining member 18 as well as rear member 38 and side member 36 of body 15 are comprised of injection molded polypropylene or noryl and thus channel-defining member 18 is itself somewhat resilient so as to assist in the engagement between tongue 26 and the slot of channel-defining member 18.

The mated configuration of tongue 26 in the slot of channel-defining member 18 is seen in the cross-sectional view of FIG. 4 and in the plan view of FIG. 3. This configuration provides a secure and positively positioned mounting in which torque backlash and longitudinal movement of the marker on the pen arm mount is minimized.

It may be noted also that the slot of channel-defining member 18 includes at its rear entrance a tapered configuration 42 to assist in the receiving of the forward tip of tongue 26 upon mounting of marker 10 on pen arm 12.

In the embodiment of the pen and pen arm of the present invention shown in FIG. 1, pen arm 12 and nib connecting member 14 are both of straight configuration. Either or both, however, may include one or more bends in the plane perpendicular to the plane of pen arm 12 so as to facilitate the assembly of a plurality of such pen and pen arms into a mating configuration permitting the use of a plurality of such combinations in a single instrument where the vertical space for the plurality of pen and pen arm combinations is relatively small. Such configurations permit a plurality of such pens to be disposed with the respective writing tips thereof on a common writing surface.

Moreover, the vertical space required for these pens is further reduced by the fact that the mounting channel is located on the rear of the marker body rather than on the top or bottom surface thereof.

While this invention has been described with respect to a particular embodiment thereof, it is not limited thereto and the appended claims are intended to encompass not only the specific form of the invention disclosed but such other variants and modifications of the invention as may be made by those skilled in the art without departing from the true spirit and scope thereof.

We claim:

1. An instrument pen including a pen body, a writing nib mounted at the forward end therof, and a pen arm-receiving mounting member at the rearward end thereof, the pen arm mounting member defining a slot extending longitudinally away from said pen body, said slot having two relatively short length segments, with parallel edges a first forward segment being of less width than a second rearward segment, said segments being connected by a symmetrical tapered segment, said slot thereby being adapted to be securely mounted by engagement along its full length, with a relatively short sliding movement and relatively little force on a flat blade pen arm having a forward tongue portion with two relatively short length segments correspondingly sized and shaped with respect to said two segments of said slot.

2. A pen, as recited in claim 1, wherein said mounting member includes a relatively flat top wall with a lengthwise space therein, the remainder of said top wall overlying at least a portion of said slot.

3. A pen, as recited in claim 2, wherein said slot includes an entry taper at the rearward limit thereof.

4. A pen as in claim 1 wherein said slot member is constructed of a resilient plastic material.

5. A pen, as recited in claim 1, wherein said slot of said mounting member is adapted to receive said forward tip of said pen arm with the leading edge of said pen arm abutting against the rear end of said pen body.

6. A recording instrument pen including a pen body, a nib at the forward end thereof, and a mounting member at the rear thereof, and a flat blade pen arm upon which said pen, through said pen mounting member, is adapted to be securely mounted with little force over a relatively short length of sliding engagement, said pen mounting member defining a slot extending longitudinally away from said pen body and having a first forward short segment and a second rearward segment, said forward segment being of less width than said rearward segment, said pen arm having a forward mounting tip with first and second segments corresponding in width, length and lengthwise position to the first and second segments of said slot of said mounting member, said forward tip of said flat blade pen arm adapted to be received in said slot of said pen body member and to slidingly engage, with relatively little mounting force through the limited distance corresponding to the length of said first and second segments, said tip engaging said slot along the full length of said slot and tip.

7. A pen and pen arm, as recited in claim 6 wherein said forward mounting tip of said pen arm is of resilient metal construction and is slightly bowed to assist in the engagement of said mounting tip of said pen arm in said pen mounting member slot.

8. A pen and pen arm, as recited in claim 7 wherein said mounting tip of said pen arm further includes a centrally disposed indentation to assist in the engagement of said mounting tip of said pen arm in said mating mounting slot of said pen.

* * * * *